(No Model.) 2 Sheets—Sheet 1.

G. W. STAPLES.
HORSE HAY RAKE.

No. 453,949. Patented June 9, 1891.

Attest:
J. H. Schott
Wm. L. Boyden

Inventor
George W. Staples,
per Fred E. Tasker, Atty (No Model.) 2 Sheets—Sheet 2.

G. W. STAPLES.
HORSE HAY RAKE.

No. 453,949. Patented June 9, 1891.

Attest:
J. H. Schott
Wm. L. Boyden

Inventor
George W. Staples
per Fred E. Tasker,
Atty.

UNITED STATES PATENT OFFICE.

GEORGE W. STAPLES, OF TEMPLE, MAINE.

HORSE HAY-RAKE.

SPECIFICATION forming part of Letters Patent No. 453,949, dated June 9, 1891.

Application filed December 1, 1890. Serial No. 373,223. (No model.)

*To all whom it may concern:*

Be it known that I, GEORGE W. STAPLES, a citizen of the United States, residing at Temple, in the county of Franklin and State of Maine, have invented certain new and useful Improvements in Horse Hay-Rakes; and I do hereby declare the following to be a full, clear, and exact description of the invention, such as will enable others skilled in the art to which it appertains to make and use the same.

This invention relates to an improvement in horse hay-rakes, the object of the invention being to improve the dumping mechanism of the rake, so that it may be operated either by foot or hand power with ease and dispatch, and may be economical, light, and strong, the parts being so combined as not to be easily disarranged or dislocated from their proper position; and the invention therefore consists, essentially, in the construction, arrangement, and combination of parts, substantially as will be hereinafter described and claimed.

Figure 1:
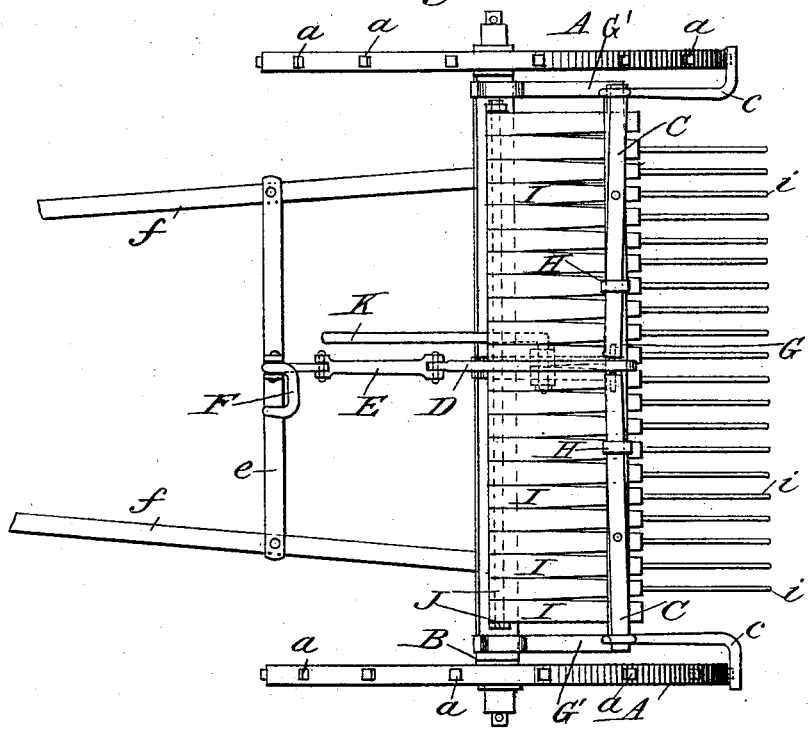
Figure 2:
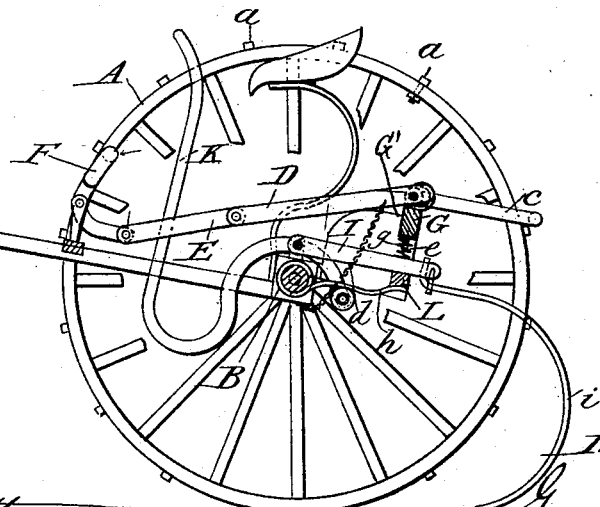
Figure 3:
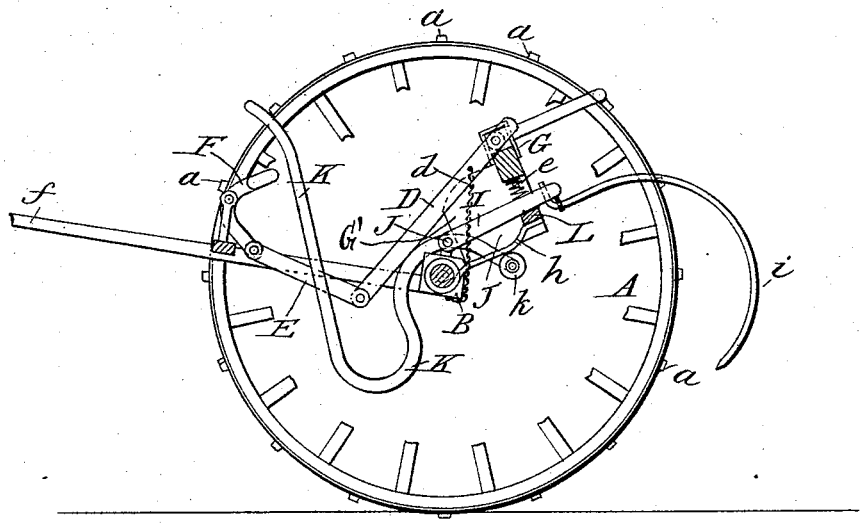
Figure 4:
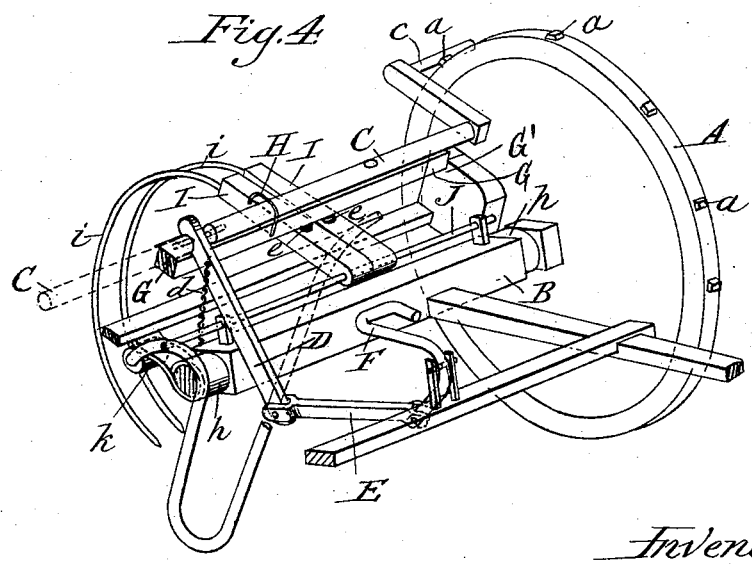

In the accompanying drawings, illustrating my invention, Figure 1 is a top plan view of my improved horse hay-rake. Fig. 2 is a sectional elevation of the same with the parts shown in the relative position that they occupy when the rake-teeth are on the ground in operative position. Fig. 3 is a similar sectional elevation showing the parts in the relative position that they occupy when the rake-teeth have been elevated for the purpose of dumping. Fig. 4 is a partial perspective view of my improved horse hay-rake, certain of the essential parts being shown in such a manner as to more fully bring out the construction and operation of the rake.

Like letters of reference designate corresponding parts throughout all the different figures of the drawings.

A A designate the wheels, and B the axle; $f f$, the shafts, and $e$ the bar which connects the shafts of my improved hay-rake. The wheels A A may be of any suitable and convenient construction, and are provided on their peripheries with pins or square-headed bolts $a a$, fixed to the fellies of the wheel or to the tire at suitable distances apart, preferably between the spokes. These pins or bolts are simply projections on the peripheries of the wheels and have a function in the operation of the rake, which will be hereinafter more fully explained.

$i\ i$ designate the rake-teeth, of which there may obviously be any number, such as the usual number of twenty-six or any other desired number. These teeth are of the ordinary construction and are rigidly connected to the parallel wooden slats I I, which lie alongside of each other in a substantially horizontal series, each slat I having a tooth $i$ connected to it, and said slats having their forward ends pivoted upon a horizontal rod J, supported on the axle. It will thus be seen that these slats I I are susceptible of a movement up or down upon their pivotal support to a greater or less extent. When they are in their depressed position or position of substantial horizontality, the rake-teeth $i$ will have their points on the ground and the rear ends of the slats or strips I will at this time be nearly upon the horizontal bar L. This bar L is held in position by means of a suitable number of brackets or arms $h\ h$, three of them being shown in the drawings, said arms being connected to the axle and to the under side of the bar L, one of them being at the middle of the length of the axle, while the other two are at the ends thereof, respectively. These arms $h$ are preferably strips of metal which encircle the axle and are movable thereon, so that the bar L may be moved up and down, the arms $h$ being rigidly fastened to said bar L.

Above the horizontal bar L is located a similar horizontal bar G, parallel to bar L, the series of slats or strips I lying between the said two bars L and G. The horizontal bar G is supported by means of end pieces G', belonging to the frame and located adjacent to the wheels, the bar G being rigidly secured to these pieces G', to which end pieces the bar L is also rigidly connected, so that in this way the parallel bars G and L, connected rigidly together at their ends, and the end arms $h\ h$ are secured rigidly to these end pieces G'. Said bar G is provided on its under side with downwardly-projecting pins $g$, and also a series of coiled springs $e$ is arranged below the said bar G, said springs being entered by the aforesaid pins $g$ and having their lower ends near the strips I. These springs serve to give the teeth a certain amount of play or flexibility, the strips I being movable between bars G and L, which movement is controlled and regulated by the springs which allow the rake-fingers to operate yieldingly.

Upon the upper edge of the horizontal bar G are carried two levers C C, which are pivoted to said bar G, said levers C C being provided at their outer ends with right-angled bent arms $c$ $c$, that come into proximity to the periphery of the wheels A A and as the levers twist on their pivots are brought into contact with the projections on the peripheries of the wheels, for a purpose to be presently explained. These levers C C and the under bar G, which carries them, are surrounded by straps H H, which limit the extent of oscillation of the levers. Further, it will be noted that the inner ends of these levers C C are separated for a short distance in order to permit one end of a link D to be loosely connected therein by pivots to the end of each of the said levers C. The other end of the link D is pivotally connected to another link or bar E, extending forwardly in the same direction as link D, and this link E in turn is pivoted to one end of a foot-lever F, which, as shown in Figs. 3 and 4, is pivoted in a suitable support fastened to the cross-bar E, which connects the thills. The foot-lever F is suitably bent, as shown, so that it may be in convenient position to permit the operator to place his foot thereon whenever he desires to operate the levers which I have just described for the purpose of vibrating the horizontal levers C C and bringing the bent ends of said levers into contact with the projections on the wheel peripheries when the rake is to be freed from the grass which it may have collected, or is, in other words, to be dumped. A chain $d$ has one end connected to the link D and the other end to the axle B, the purpose of this chain being to prevent the link D from moving upward too far, and in consequence the chain operates to throw back the rake after the dumping has been completed.

Thus far I have described the means whereby the rake is automatically dumped by the simple pressure of the foot upon the foot-lever; but it is necessary now to refer for a moment to a hand-lever whereby the driver may, whenever he desires, lift the rake from the ground by hand-power. K denotes this hand-lever. Its form is clearly shown in Figs. 2, 3, and 4. It is curved suitably and is pivoted to the rod J near the middle point thereof. The rear end of the lever K extends behind the axle and beneath the middle arm $h$, which arm, as we have seen, is loosely connected to the axle and rigidly connected to the under side of beam L. The rear extremity of lever K at this point is provided with a roller $k$, which rests beneath and operates against the under side of the middle arm $h$. The driver, whenever he desires to do so, can easily press with his hand upon the forwardly-projecting end of the hand-lever K, and the result of this downward pressure on this end of the lever will be to cause the roller $k$ to press against the adjacent arm $h$, and thus the beam L and the series of slats resting thereon with their connected rake-fingers will be lifted, so that the fingers will be released from the ground and the grass which they may have gathered.

It remains to describe the operation in dumping by foot-power. Whenever it is desired to dump the rake, the driver will place his foot upon the foot-lever F, which we will assume is in the position shown in Fig. 2. The teeth $i$ being now upon the ground, the result of the pressure upon the lever F in the direction shown by the arrow in Fig. 2 will be to give the links E and D a backward push, and this will oscillate the levers C C upon their pivots and cause the bent ends $c$ $c$ to take such a position that the adjacent pins or projections $a$ $a$ on the wheel peripheries will strike them. The result of this contact of the wheel projections with the right-angled bent arms $c$ will be to lift the said bent arms, and consequently lift the levers C C, beam G, and the connected beam L, which will obviously lift the series of slats I, which are just above said beam L, and also the connected rake-teeth $i$, the parts lifting in the manner shown in Fig. 3 until the rake-teeth have been elevated sufficiently far from the ground to permit the hay which they have gathered to be disengaged therefrom and to fall, and then the wheel projections will become disengaged from the right-angled crank-arms and the teeth will fall back upon the ground in normal position to again work in the gathering of the strewn hay.

Many minor changes may be made in the exact construction, arrangement, and combination of the several parts without departing from the present invention, inasmuch as it will be necessary, doubtless, to change the proportion, size, and relative structure of many of the mechanical elements in order to adapt them to such exigencies and demands as may be found in the actual use and necessities of the device.

Having thus described my invention, what I claim as new, and desire to secure by Letters Patent, is—

1. In a horse hay-rake, the combination of a series of teeth, a frame consisting of an upper and lower horizontal bar rigidly connected together at their ends and pivotally supported upon the axle, a pair of levers having bent ends which extend into proximity to the wheels, said levers being pivoted to the upper of the horizontal bars of the said frame, the wheels of the carriage provided with projections into contact with which the bent ends of the levers are adapted to come, a foot-lever, and connections between it and the inner opposing ends of the said levers, which ends are sufficiently far apart to allow of the pivoting between them of the said connections, substantially as described.

2. In a horse hay-rake, the combination of the wheels having peripheral projections, a series of teeth carried by strips pivoted upon the axle, a frame consisting of parallel bars rigidly connected at their ends, between which bars the series of teeth-strips lie and are adapted to be lifted accordingly as the said bars move up and down in consequence of being pivotally mounted upon the axle, the horizontal levers pivoted upon the upper bar of said frame and having bent ends which are adapted to come in contact with the wheel projections, a foot-lever, a link pivoted to the inner adjacent ends of the two aforesaid levers with bent ends, and a link pivoted to said link and the foot-lever, substantially as described.

3. The combination of the wheels having peripheral projections, the series of pivoted slats to which the rake-teeth are connected, the frame consisting of a beam below said slats and another beam above said slats, said beams being rigidly connected together at the ends and the frame being movably mounted upon the axle by means of suitable arms pivotally connected to the axle, a pair of levers pivoted on the last-mentioned beam and having bent ends adapted to come into contact with projections on the wheel periphery, a foot-lever, and the links connecting the same with the inner ends of said levers, substantially as described.

4. In a horse hay-rake, the combination of the beam having arms connected thereto which are pivotally connected to the axle, the series of slats or strips pivoted to a rod secured on the axle, said strips having the teeth connected thereto, the beam above said strips rigidly connected at its ends to the lower beam, having springs bearing upon the strips, a pair of pivoted levers on the top of said beam having bent arms adapted to come into contact with projections on the wheel peripheries, a link pivoted to the inner ends of said levers, and a link pivoted to said link and to the foot-lever, substantially as described.

5. In a horse hay-rake, the combination of the wheels and axle, the series of teeth connected to a series of pivoted slats, a beam supporting said slats and having arms connected thereto which are loosely mounted on the axle, and the hand-lever pivoted above the axle and having its rear end provided with a roller which works under one of the said loosely-mounted arms, substantially as described.

6. The combination, in a horse hay-rake, of the wheels A A, having peripheral projections $a$ $a$, the axle B, the series of horizontal slats I I, to which the rake-teeth $i$ are rigidly connected, said slats being pivoted to a rod supported rigidly upon the axle, the beam L, located below the said slats I, the beam G above the said slats, said beams being rigidly connected together at their ends by the end pieces G', and the said frame consisting of beams G and L and end pieces G', being movably mounted upon the axle by means of suitable arms rigidly connected to the frame and pivotally to the axle, the levers C C, pivoted on beams G, held within the straps H and provided with bent arms $c$ $c$, and the links D and E, pivoted to each other and connecting the levers C with the foot-lever F, substantially as described.

7. The combination of the wheels A, having peripheral projections $a$, the axle B, the beam L, the beam G, said beams being rigidly connected together at their ends by means of end pieces G', to which they are both secured, the arms $h$, loosely mounted on the axle and rigidly connected to this frame, the series of slats I, carrying the rake-teeth, said slats being pivoted upon the upper side of the axle to a rod secured thereon, the series of springs $g$ below beam G and bearing upon the slats I, which slats lie between the parallel beams G and L, the levers C, pivoted upon the beam G and having their inner ends in proximity to each other and having their outer ends bent and adapted to come into contact with the projections on the wheels, the link D, pivoted between the inner ends of said levers C, and the foot-lever F, connected by a link with the link D, all substantially as described.

8. The combination of the wheels and axle, the series of teeth $i$, the beam L, having arms $h$ loosely mounted on the axle, the series of slats I, carrying the teeth, and the hand-lever K, carrying at its rear end a roller operating beneath one of the arms $h$, substantially as described.

In testimony whereof I affix my signature in presence of two witnesses.

GEORGE W. STAPLES.

Witnesses:
E. O. GREENLEAF,
SETH E. BEEDY.